US 8,449,451 B2

(12) United States Patent
Dawe

(10) Patent No.: US 8,449,451 B2
(45) Date of Patent: May 28, 2013

(54) METHOD AND APPARATUS THAT ENABLES REMOTE OPERATION OF A PLEASURING DEVICE THROUGH A COMMUNICATIONS NETWORK

(75) Inventor: Russell B. Dawe, Shenandoah Junction, WV (US)

(73) Assignee: Russell Dawe, Shenandoah Junction, WV (US)

( * ) Notice: Subject to any disclaimer, the term of this patent is extended or adjusted under 35 U.S.C. 154(b) by 1271 days.

(21) Appl. No.: 12/189,254

(22) Filed: Aug. 11, 2008

(65) Prior Publication Data
US 2010/0034471 A1  Feb. 11, 2010

(51) Int. Cl.
*A61F 5/00* (2006.01)
(52) U.S. Cl.
USPC .......................................................... 600/38
(58) Field of Classification Search
USPC ................ 600/38–41; 128/897–898; 382/229
See application file for complete search history.

(56) References Cited

U.S. PATENT DOCUMENTS

| 6,368,268 B1 * | 4/2002 | Sandvick et al. ............... 600/38 |
| 7,438,681 B2 * | 10/2008 | Kobashikawa et al. ......... 600/38 |
| 7,938,789 B2 * | 5/2011 | Imboden et al. ................ 601/46 |
| 2002/0133103 A1 * | 9/2002 | Williams et al. ................ 601/46 |

* cited by examiner

*Primary Examiner* — John Lacyk
(74) *Attorney, Agent, or Firm* — Ronald E. Prass, Jr.; Prass LLP

(57) ABSTRACT

A method and apparatus that enables remote operation of a pleasuring device through a communications network is disclosed. The method may include receiving one or more text strings at a first communication device from a second communication device through the communications network, recognizing one or more words or phrases from the received one or more text strings, determining if the recognized one or more words or phrases are found in a lexicon, matching the recognized one or more words or phrases with its corresponding action stored in the lexicon, and signaling the pleasuring device to perform the corresponding action.

21 Claims, 4 Drawing Sheets

METHOD AND APPARATUS THAT ENABLES REMOTE OPERATION OF A PLEASURING DEVICE THROUGH A COMMUNICATIONS NETWORK

BACKGROUND OF THE DISCLOSURE

1. Field of the Disclosure

This disclosure relates to pleasuring devices, and in particular, a method and apparatus that enables remote operation of a pleasuring device through a communications network.

2. Introduction

Sales of adult sex toys (or "pleasuring devices") continue to increase each year. While some individuals may seek to enjoy these toys in private, others may wish to participate with his or her partner, for example. However, the individual's partner may be in a different geographic location, overseas, etc. which currently makes such participation limited to audio and visual contact.

SUMMARY OF THE DISCLOSURE

A method and apparatus that allows remote operation of a pleasuring device through a communications network is disclosed. The method may include receiving one or more text strings at a first communication device from a second communication device through the communications network, recognizing one or more words or phrases from the received one or more text strings, determining if the recognized one or more words or phrases are found in a lexicon, matching the recognized one or more words or phrases with its corresponding action stored in the lexicon, and signaling the pleasuring device to perform the corresponding action.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Figure 1:
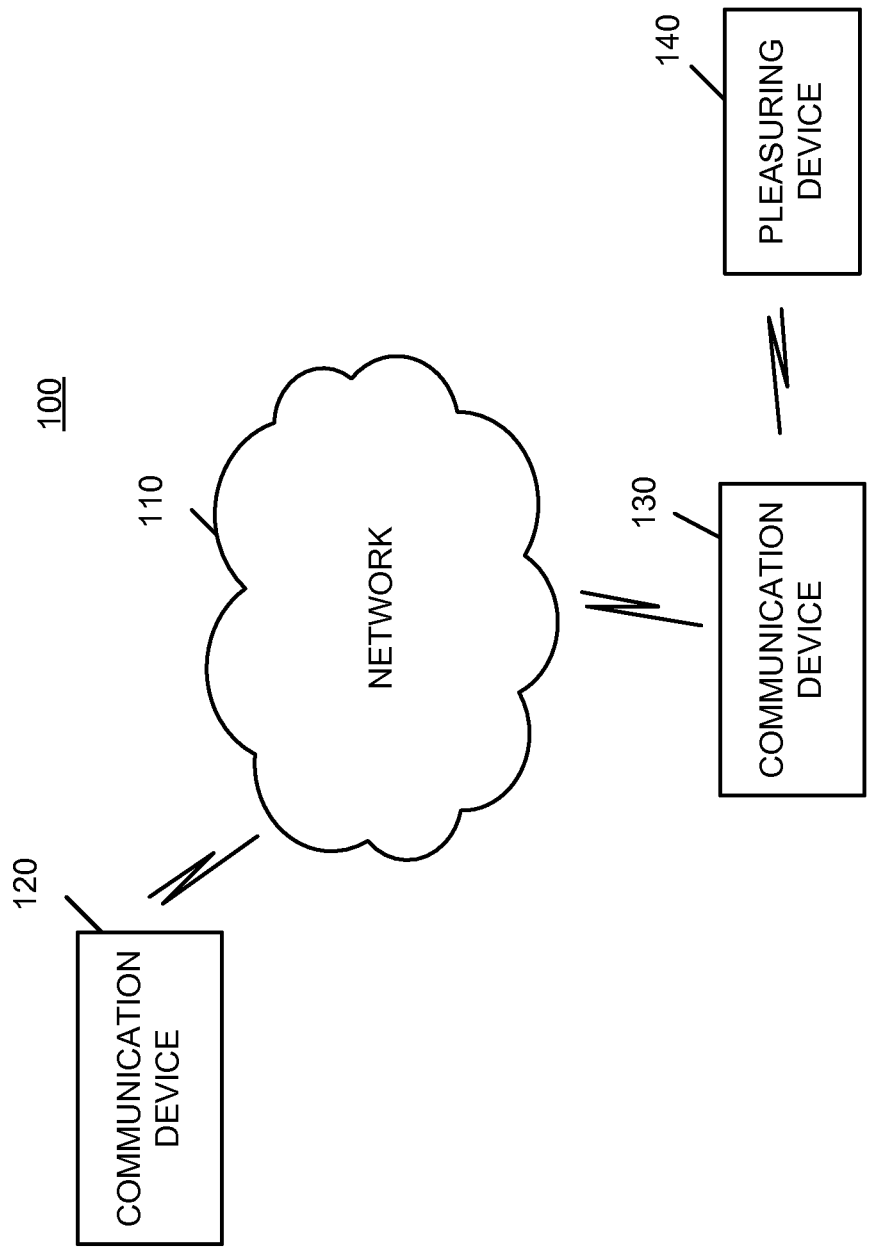
FIG. 1 is an exemplary diagram of a network environment in accordance with a possible embodiment of the disclosure.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure. This disclosure may concern the message flow and processing used to control external devices, such as adult sex toys ("pleasuring devices") or other remote devices, from incoming Short Message Service (SMS or "text messages"), instant messages (IM), or chat services that may be sent and received to/from a communications device, such as a computer, cell phone, personal digital assistant (PDA), etc., for example.

This process may assume the following services provided by the host messaging device (i.e., computer, laptop, PDA, cell phone, etc.):

access to the incoming message stream via plug-in or device SDK software.

ability to present the user with configuration screens and dialogs access to the wireless interface manager (e.g., BLUETOOTH® interface software)

While the process may be slightly different based on the particular host device employed (laptop, personal computer, cell phone, PDA), only the incoming message probe and scan component may actually change based on the message type being processed (e.g., SMS, IM, etc.).

The process may utilize several key elements in order to achieve control over remote external devices using a very simple interface. These elements may include:

The receiving communication device may have configuration control over the remote control process.

The sending communication device may control devices at the remote receiver's site with no additional software, hardware, or application utility present at the sender's site.

This process allows the receiving communication device to retain overriding operation over the controlled device at all times.

With respect to controlling devices via IM or chat services, incoming messages may arrive at the user's communication device and may be sent to the IM or chat application (such as America Online Instant Messaging (AIM), Trillian, Yahoo, etc.). The operation module may insert a software probe into the IM application (via a plug-in module or application programming interface (API) (API callback, for example) may receive a copy of the message and address information (such as the contact name and IM service). The original message may be sent on to the IM application without modification.

The copied message may be checked by the operation module to see if the sender is a currently enabled contact. If not, no scan is performed and the application idles until another message arrives Assuming the contact is currently active and enabled, the operation module may scan the actual message to search for the inclusion of any of the capture words or phrases currently configured for the contact and the enabled device. Note that the capture phrase, word, or symbol may be embedded anywhere in the message (i.e. it can be a part of a word or phrase or any part of the sent message, for example). If no matching phrase is found, the operation module may idle until another message arrives. If a matching capture phrase is found, the operation module may process the associated command for the device and initiate a control sequence to the appropriate wireless interface (such as BLUETOOTH®) for transmission to the device itself.

With respect to controlling devices via SMS as used by mobile devices (cell phones, PDAs, etc.), the operation module may add itself as a destination for messages coming from enabled users (part of the SMS API interface, for example). The SMS processing may also, optionally, wake up the operation module, if required. A copy of the SMS may be sent to the operation module and the operation module may send the original message to the SMS application without modification.

Thus, the primary difference between SMS and IM message processing is the way the device control application "hooks" itself into the message stream. For IM and chat services, it scans incoming messages for enabled users. For SMS, it adds itself as a destination for enabled users. From this point on, processing may be nearly identical to the processing for IM messaging. As such, the copied message may be checked by the operation module to see if the sender is a currently enabled contact. If not, no scan is performed and the operation module may idle until another message arrives.

Assuming the contact is currently active and enabled, the operation module may scan the actual message for the inclusion of any of the capture phrases currently configured for the contact and for the enabled device. Note that the capture phrase, word, or symbol may be embedded anywhere in the message (i.e. it can be a part of a word or phrase or any part of the sent message). If no matching phrase is found, the operation module may idle until another message arrives.

If a matching capture phrase is found, the operation module may process the associated command for the remote device and initiate a control sequence for the appropriate wireless interface (such as BLUETOOTH®) for transmission to the device itself. The device configuration file may contain the particular associated transmission command sequence for the matching capture phrase.

Actual transmission of the command sequence may be performed via the communication device's (laptop, PDA, etc.) wireless communication interface (such as the BLUETOOTH® interface protocols, for example). Acknowledgement of the command by the communication device may be expected for those devices having that capability (i.e. the remote device replies with a "command received" acknowledgement message, for example) and repeat transmission may be undertaken until the device is properly running the command or the transmission attempt times out (e.g., settings for this feature may be found in the device configuration file).

The pleasuring device may have an internal microcontroller to interpret the digital commands sent by the controlling software via the appropriate wireless interface (BLUETOOTH®). The internal microcontroller may respond with an acknowledgement message and then operates the desired control interface accordingly (typically, setting a signal level "ON" or "OFF" as needed by the particular device). Some messages from the controlling software may not precipitate any actions other than responding with a status or other message back to the controlling software (e.g., status check messages, battery level status messages, etc.).

Action messages may include "ON", "OFF", "SEQUENCE", "PULSE", "TOGGLE", or any other message needed to control a particular device. These messages may be created uniquely for each device's microcontroller for use by the application software and may be unlimited in their potential variety (i.e. whatever messages needed to control a given device may be created, for example).

FIG. 1 illustrates an exemplary diagram of a network environment 100 in accordance with a possible embodiment of the disclosure. In particular, the communications system may include communication devices 120, 130, connected through network 110, and a pleasuring device 140 that wired or Tirelessly communicates with the communication device 130.

Network 110 may represent any possible communications network, including wireless telephone networks, hardwired telephone networks, wireless local area networks (WLAN), the Internet, an intranet, etc.

The communication device 120, 130 may be a computer, personal computer, portable computer, server, portable MP3 player, satellite radio receiver, AM/FM radio receiver, satellite television, portable music player, wireless radio, wireless telephone, portable digital video recorder, cellular telephone, mobile telephone, personal digital assistant (PDA), etc., or combinations of the above, for example, that is capable of communicating with another communication device 120, 130 through a network 110.

The pleasuring device 140 may be any device that may be remotely operated by a user, such as an adult sex toy, a children's toy, a pet toy, etc. The pleasuring device 140 may be movable in a variety of manners and at various speeds, including moving in one or more directions, spin, twist, vibrate, etc. The pleasuring device 140 may contain a processor and communication interface in order to receive wireless commands, such as on/off, movement commands, etc., using wireless technology, such as BLUETOOTH®, for example. The pleasuring device 140 may also operate in a wired communication fashion through a Universal Serial Bus (USB) port, for example, located on the communication device 130.

As an adult sex toy, the pleasuring device 140 may be suited for a male or female to serve a plurality of purposes, such as massaging, touching stimulation, etc. As a children's toy or pet toy, the pleasuring device 140 may be a toy that may talk, move, make noise, etc. in order to entertain the child or pet from a remote location. For example, a pet owner may enable the pleasuring device 140 at the receiving communication device 130 prior to leaving and may interact with their pet using the pleasuring device 140 (such as a toy ball, mouse, etc.) from a remote location.

Figure 2:
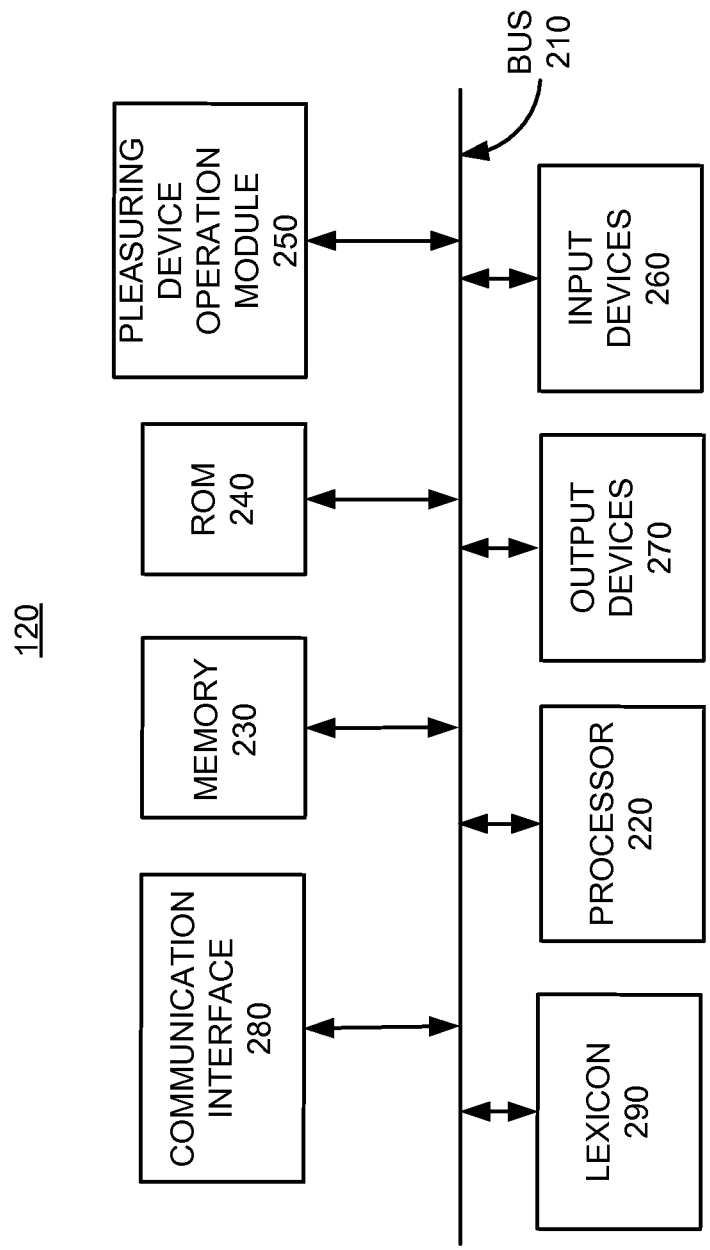
FIG. 2 is a block diagram of an exemplary communication device in accordance with a possible embodiment of the disclosure.

FIG. 2 is an exemplary block diagram of the communication device 130 that is communicating with the pleasuring device 140 in accordance with a possible embodiment of the disclosure. The communication device 130 may include a bus 210, a processor 220, a memory 230, ROM 240, a pleasuring device operation module 250, input devices 260, output devices 270, a communication interface 280, and a lexicon 290. Bus 310 may permit communication among the components of the communication device 130.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. Memory 230 may also include any type of media, such as, for example, magnetic or optical recording media and its corresponding drive. ROM 240 may include a conventional ROM device or another type of static storage device that stores static information and instructions for processor 220.

Input devices 260 may include one or more conventional mechanisms that permit a user to input information to the communication device 130, such as a keyboard, a mouse, a pen, a voice recognition device, etc. Output devices 270 may include one or more conventional mechanisms that output information to the user, including a printer, one or more speakers, or a medium, such as a memory, or a magnetic or optical disk and a corresponding disk drive.

Communication interface 280 may include any transceiver-like mechanism that enables the communication device 130 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of the communication device 130, communication interface 280 may not be included in the exemplary the runway traffic management unit 130 when the runway traffic management process is implemented completely within the communication device 130.

The lexicon 290 may include a plurality of words and phrases that have a corresponding action associated with each word and phrase. The corresponding action may be an action that may be performed by the pleasuring device 140, for example. The words and phrases and corresponding actions may be specific to a particular pleasuring device 140 or to a particular partner or contact from a remote communication device 120, for example. Thus, a user at the communication device 130 may set up profiles for their own (or another's) preferences, for particular pleasuring devices 140, or for particular partners or contacts with which they may desire to communicate. The profiles may be stored in the lexicon 290 or in another memory location, such as memory 230, for example.

For example, the pleasuring device 140 profiles may includes information about the types of control signals each device requires (On/Off/Toggle, etc.), the name of the device, additional control options and buttons available to the user, and any other device specific information. In this manner, as new devices become available to the user, only this one configuration file may need to be updated to accommodate them. All the user dialogs and setup screens may be dynamically configurable according to the information in the device control file, such as a .xml file.

The communication device 130 may perform such functions in response to processor 220 by executing sequences of instructions contained in a computer-readable medium, such as, for example, memory 230, a magnetic disk, or an optical disk. Such instructions may be read into memory 230 from another computer-readable medium, or from a separate device via communication interface 280.

The communication device 130 illustrated in FIGS. 1 and 2 and the related discussion are intended to provide a brief, general description of a suitable computing environment in which the disclosure may be implemented. Although not required, the disclosure will be described, at least in part, in the general context of computer-executable instructions, such as program modules, being executed by the communication device 130, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

For illustrative purposes, the exemplary operation of the pleasuring device operation module 250 and the pleasuring device operation process will be described below in relation to the diagrams shown in FIGS. 1-2.

Figure 3:
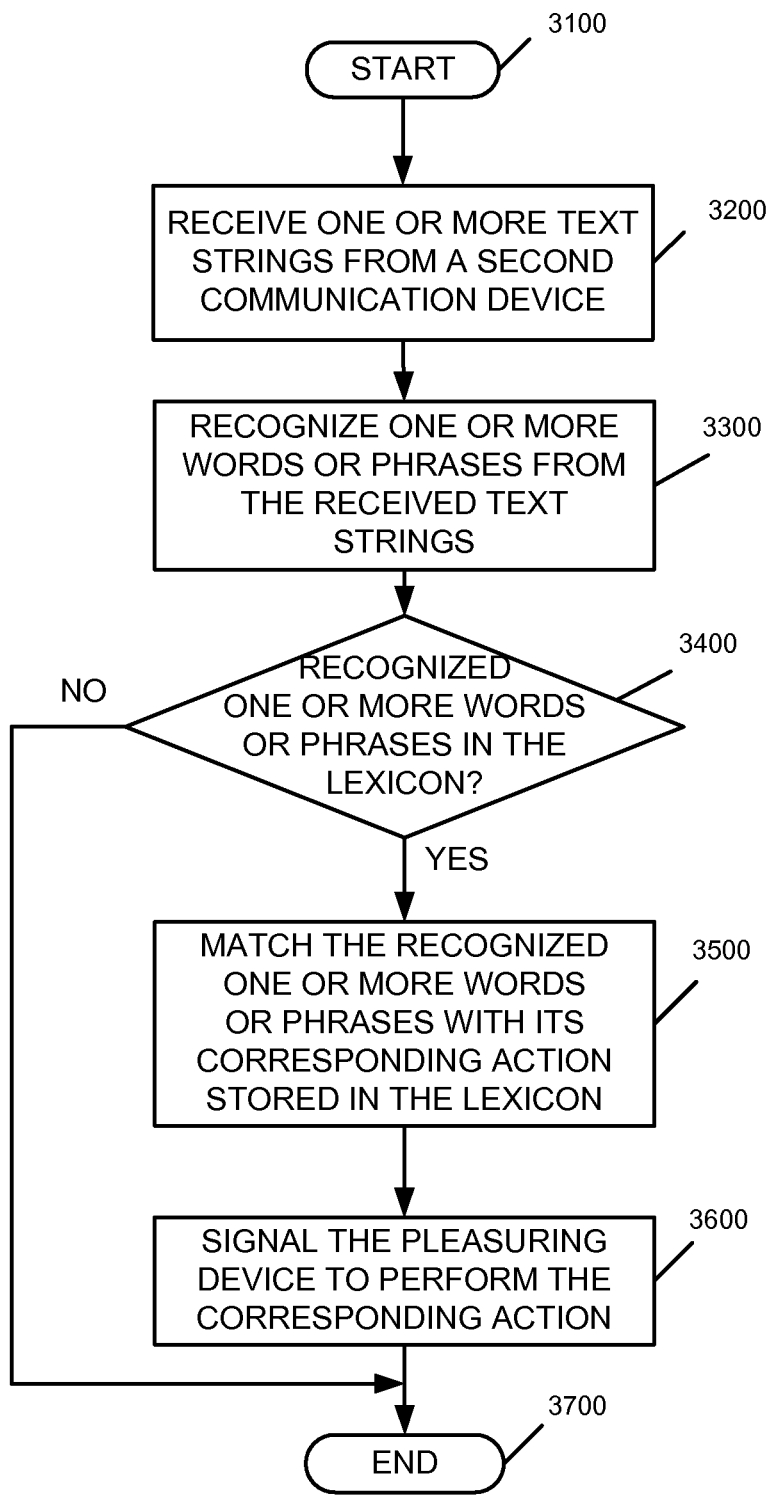
FIG. 3 is an exemplary flowchart illustrating one possible remote pleasuring device operation process in accordance with one possible embodiment of the disclosure.

FIG. 3 is an exemplary flowchart illustrating one possible pleasuring device operation process in accordance with one possible embodiment of the disclosure. The process begins at step 3100 and continues to step 3200 where the pleasuring device operation module 250 may receive one or more text strings at the communication device 130 from another communication device 120 through the communications network 110 using the communication interface 280, for example. The received text strings may be contained and written message format, including an electronic document, an e-mail, an instant message, a chat service message, or a text message, for example.

After receiving the one or more text string, the pleasuring device operation module 250 may also check to see if the sender is a currently enabled contact from the user's profile, user interface selection, etc. for example. If the sender is not an enabled contact, the lexicon 290 may not be search for words and phrases in the text string and the pleasuring device operation module 250 may idle until another test string arrives.

At step 3300, the pleasuring device operation module 250 may recognize one or more words or phrases from the received one or more text strings using any text recognition algorithm known to those of skill in the art. At step 3400, the pleasuring device operation module 250 determines if the recognized one or more words or phrases are found in the lexicon 290. If the pleasuring device operation module 250 determines that the recognized one or more words or phrases are not found in the lexicon 290, the process may go to step 3700, and end.

However, if the pleasuring device operation module 250 determines that the recognized one or more words or phrases are found in the lexicon 290, then at step 3500, the pleasuring device operation module 250 matches the recognized one or more words or phrases with its corresponding action. At step 3600, the pleasuring device operation module 250 signals the pleasuring device 140 to perform the corresponding action. The process may go to step 3700, and end.

Figure 4:
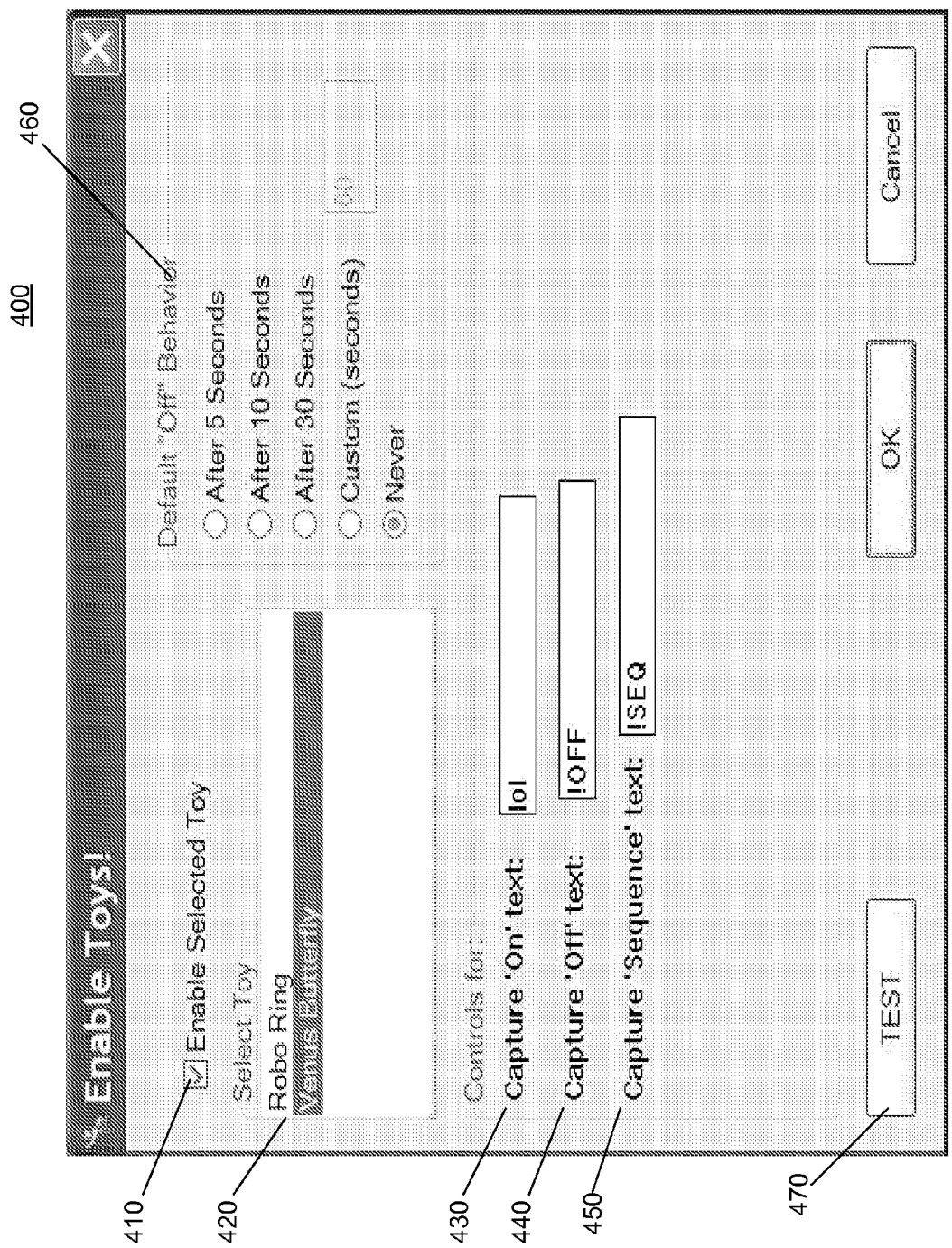
FIG. 4 is a diagram of an exemplary pleasuring device operation user interface in accordance with a possible embodiment of the disclosure.

FIG. 4 is a diagram of an exemplary pleasuring device operation user interface 400 in accordance with a possible embodiment of the disclosure. The user interface 400 may present several options for the user, including a device enable selection box 410 (whether the contact is enabled to control the selected toy), a list of available devices for configuration 420, the default "off" behavior 460, and the capture phrases 430, 440, 450 expected by the selected pleasuring device 140. The user may also manually operate the device through the "TEST" option 470.

The capture phrases (or words) 430, 440 are phrases that the pleasuring device operation module 250 may look for to activate or turn off the pleasuring device 140. The capture sequence phrase 450 looks for a text item to begin a sequence session, for example.

The default "off" behavior 460 may allow the receiving user to set a time to shut off the selected pleasuring device 140 even if the sender never chooses to do so. In this manner, it is possible for the receiving user to enable a user, trigger the device from an "innocent" phrase and have the pleasuring device 140 turn itself off without the sender even being aware the receiver has a pleasuring device 140 and that they are sending control signals for the pleasuring device 140.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components in the disclosed embodiments each processing the content in various possible ways. It does not necessarily need to be one system used by all end users. Accordingly, the appended claims and their legal equivalents should only define the disclosure, rather than any specific examples given.

I claim:

1. A method for enabling remote operation of a pleasuring device through a communications network, comprising:
   receiving one or more text strings at a first communication device from a second communication device through the communications network;
   recognizing one or more words or phrases from the received one or more text strings;
   determining if the recognized one or more words or phrases are found stored in a lexicon that includes a plurality of user-selected words and phrases that have a corresponding action associated with each of the plurality of user-selected words and phrases, the corresponding action being performed by the pleasuring device;
   matching the recognized one or more words or phrases with the corresponding action stored in the lexicon; and
   signaling the pleasuring device to perform the corresponding action.

2. The method of claim 1, wherein the pleasuring device is signaled using one of wired communications and wireless communications.

3. The method of claim 2, wherein the wireless communications are transmitted using Bluetooth technology.

4. The method of claim 1, wherein the received one or more text strings are contained in one of an electronic document, an e-mail, an instant message, a chat service message, and a text message.

5. The method of claim 1, wherein a user at the second communication device controls the signaling of the pleasuring device in performing the corresponding action via the first communication device.

6. The method of claim 1, further comprising:
   determining if a sender of the one or more text strings is an enabled contact as identified from one at least one of a user profile and a user interface selection, and,
   recognizing the one or more words or phrases from the received one or more text strings only when the sender of the one or more text strings is determined to be the enabled contact.

7. The method of claim 1, wherein at least one of the first and second communication device is one of a computer, a personal computer, a portable computer, a server, a portable MP3 player, a satellite radio receiver, an AM/FM radio receiver, a satellite television, a portable music player, a wireless radio, a wireless telephone, a portable digital video recorder, a cellular telephone, a mobile telephone, a personal digital assistant (PDA), and a device having a combination of the above.

8. A communication device that enables remote operation of a pleasuring device through a communications network, comprising:
   a communication interface;
   a lexicon that includes a plurality of user-selected words and phrases that have a corresponding action associated with each of the plurality of user-selected words and phrases, the corresponding action being performed by the pleasuring device; and
   a pleasuring device operation module that receives one or more text strings at the communication device from another communication device through the communications network using the communication interface, recognizes one or more words or phrases from the received one or more text strings, determines if the recognized one or more words or phrases are found in the lexicon, matches the recognized one or more words or phrases with the corresponding action, and signals the pleasuring device to perform the corresponding action.

9. The communication device of claim 8, wherein the pleasuring device operation module signals the pleasuring device using one of wired communications and wireless communications.

10. The communication device of claim 9, wherein the wireless communications are transmitted using Bluetooth technology.

11. The communication device of claim 10, wherein the received one or more text strings are contained in one of an electronic document, an e-mail, an instant message, a chat service message, and a text message.

12. The communication device of claim 8, wherein a user at the another communication device controls the signaling of the pleasuring device in performing the corresponding action.

13. The communication device of claim 8, wherein the pleasuring device operation module determines if a sender of the one or more text strings is an enabled contact as identified from one at least one of a user profile and a user interface selection, and the pleasuring device operation module recognizes the one or more words or phrases from the received one or more text strings only when the pleasuring device operation module determines that the sender of the one or more text strings is the enabled contact.

14. The communication device of claim 8, wherein the communication device is one of a computer, a personal computer, a portable computer, a server, a portable MP3 player, a satellite radio receiver, an AM/FM radio receiver, a satellite television, a portable music player, a wireless radio, a wireless telephone, a portable digital video recorder, a cellular telephone, a mobile telephone, a personal digital assistant (PDA), and a device having a combination of the above.

15. A non-transitory computer readable medium that stores instructions for enabling remote operation of a pleasuring device through a communications network, the instructions comprising:
   receiving one or more text strings at a first communication device from a second communication device through the communications network;
   recognizing one or more words or phrases from the received one or more text strings;
   determining if the recognized one or more words or phrases are found in a lexicon that includes a plurality of user-selected words and phrases that have a corresponding action associated with each of the plurality of user-selected words and phrases, the corresponding action being performed by the pleasuring device;
   matching the recognized one or more words or phrases with the corresponding action stored in the lexicon; and
   signaling the pleasuring device to perform the corresponding action.

16. The non-transitory computer readable medium of claim 15, wherein the pleasuring device is signaled using one of wired communications and wireless communications.

17. The non-transitory computer readable medium of claim 16, wherein the wireless communications are transmitted using Bluetooth technology.

18. The non-transitory computer readable medium of claim 15, wherein the received one or more text strings are contained in one of an electronic document, an e-mail, an instant message, a chat service message, and a text message.

19. The non-transitory computer readable medium of claim 15, wherein a user at the second communication device controls the signaling of the pleasuring device in performing the corresponding action via the first communication device.

20. The non-transitory computer readable medium of claim 15, further comprising:
   determining if a sender of the one or more text strings is an enabled contact as identified from one at least one of a user profile and a user interface selection, and
   recognizing the one or more words or phrases from the received one or more text strings only when the sender of the one or more text strings is determined to be the enabled contact.

21. The non-transitory computer readable medium of claim 15, wherein at least one of the first and second communication device is one of a computer, a personal computer, a portable computer, a server, a portable MP3 player, a satellite radio receiver, an AM/FM radio receiver, a satellite television, a portable music player, a wireless radio, a wireless telephone, a portable digital video recorder, a cellular telephone, a mobile telephone, a personal digital assistant (PDA), and a device having a combination of the above.

* * * * *